Jan. 26, 1960  R. C. BEACHAM ET AL  2,922,613
PINCH VALVE
Filed June 1, 1951
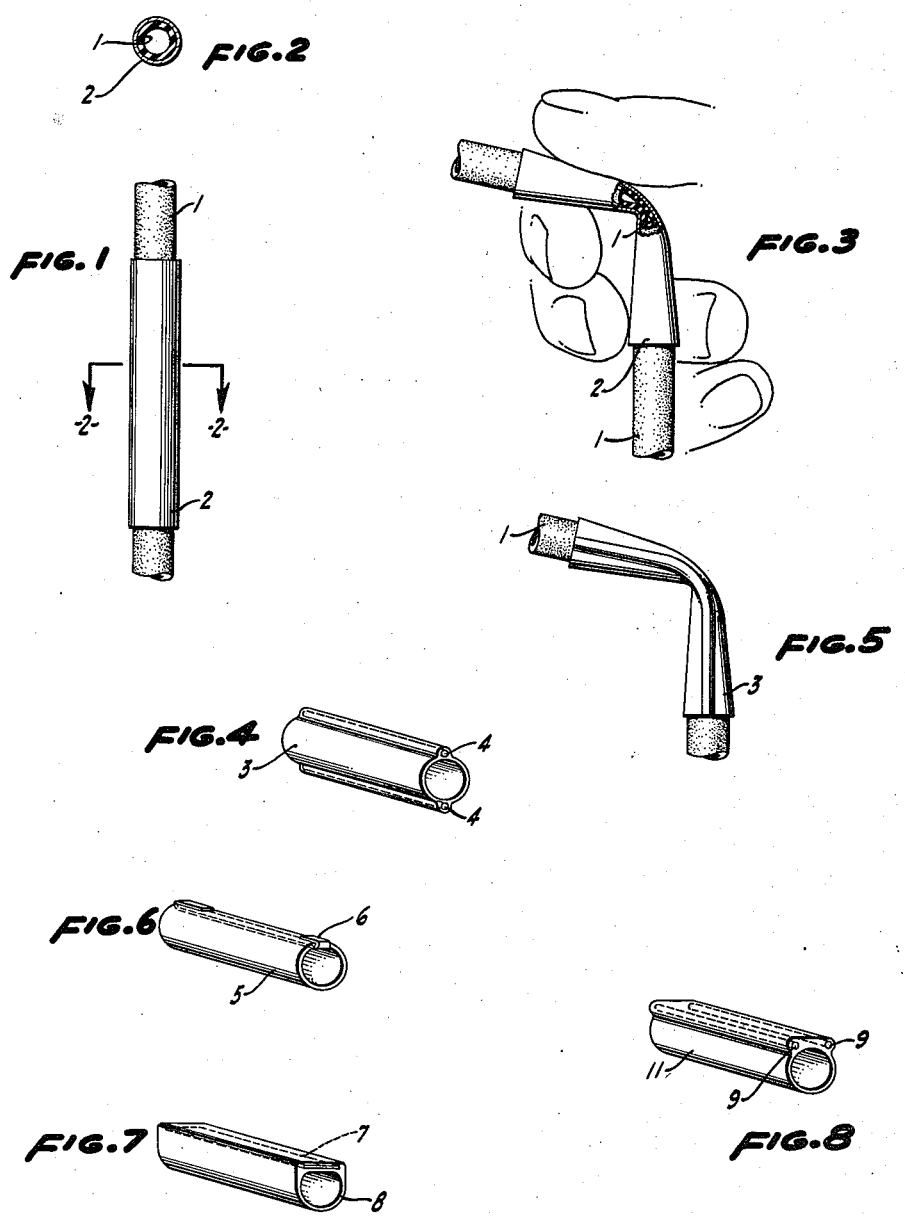
INVENTORS
ROBERT C. BEACHAM
WILLIAM F. BUTLER
BY
Mellin and Hanson
ATTORNEYS

United States Patent Office 2,922,613
Patented Jan. 26, 1960

2,922,613

PINCH VALVE

Robert C. Beacham, Richmond, and William F. Butler, Oakland, Calif., assignors to Cutter Laboratories, Berkeley, Calif., a corporation of California Application June 1, 1951, Serial No. 229,448

3 Claims. (Cl. 251—4)

This invention relates to and in general has for its object the provision of a pinch valve for use when drawing blood from a donor and when administering intravenous injections.

The primary requisites of a valve for this purpose are that it can be easily operated with one hand effectively to control the flow of fluid passing therethrough and that its cost of manufacture be sufficienlty low to justify its disposal once it has been used.

More specifically, the object of this invention is the provision of a pinch valve including a strip of malleable material fastened to the section of tubing to be controlled in parallelism therewith and which can be readily bent by the use of one hand to in turn determine the cross-sectional configuration of said tube.

The invention possesses other advantageous features, some of which, with the foregoing, will be set forth at length in the following description where that form of the invention which has been selected for illustration in the drawings accompanying and forming a part of the specification is outlined in full.

In said drawings, several forms of the invention are shown, but it is to be understood that it is not limited to such forms, since the invention as set forth in the claims may be embodied in other forms.

Referring to the drawings:

Fig. 1 is a side elevation of a pinch valve embodying the objects of my invention.

Fig. 2 is a section taken on the line 2—2 of Fig. 1.

Fig. 3 is a side elevation of the valve illustrated in Figs. 1 and 2 but in its distorted closed position, portions thereof being broken away to better illustrate its construction.

Fig. 4 is an isometric projection of a first modification of the valve illustrated in Figs. 1, 2 and 3.

Fig. 5 is a side elevation of the valve illustrated in Fig. 4 but shown in its bent, closed position.

Fig. 6 is an isometric projection of a second modification of the valve shown in Figs. 1, 2 and 3.

Fig. 7 is an isometric projection of a third modification of the valve shown in Figs. 1, 2 and 3, and Fig. 8 is an isometric projection of a fourth modification of the valve illustrated in Figs. 1, 2 and 3.

Each of these valves includes as a part thereof a section of flexible tubing 1 made of rubber or of a suitabtle plastic material and through which the blood or other intravenous solution is to flow.

As illustrated in Figs. 1, 2 and 3 an intermediate portion of the tubing 1 is encased in a sheath 2 in this instance made of a malleable material such as an aluminum alloy. The sheath should be capable of being readily bent by the use of one hand as shown in Fig. 3 and of retaining its distorted form at least against any resiliency inherent in the flexible tubing 1. The distortion produced in the sheath 2 is of course transmitted to the tubing 1 and by this means the cross-sectional area of the tubing can be diminished to any desired extent or closed off entirely. If it is desired to increase the cross-sectional area of the tubing 1 it is only necessary to straighten the sheath whereupon the cross-sectional area of the tube will be increased.

In the modification shown in Figs. 4 and 5 a flexible plastic sheath 3 has been used instead of a malleable sheath. However the same mechanical effect is obtained by molding sections of malleable wire 4 into the sheath along diametrically opposed sides thereof. The wires then serve to retain the sheath and the tube enclosed thereby in any desired form into which these members are bent.

In the modification illustrated in Fig. 6 a comparable result is obtained by a flexible plastic sheath 5 and a strip 6 of malleable material extending therethrough and having its ends bent over the ends of the sheath. Here the strip 6 like the wires 4 serves to retain its sheath and any tubing which may be incorporated therein in any desired degree of deformation.

In the modification illustrated in Fig. 7 a single flat malleable strip has been molded within a flexible plastic sheath 8 along one of flat side thereof.

Fig. 8 illustrates a modification in which a pair of spaced parallel malleable wires 9 are molded in flexible plastic sheath 11 along a side thereof.

As a practical matter each of these modifications can be made in long lengths and then cut up into sections preferably in the order of two inches long.

It will therefore be seen that I have provided a pinch valve, easily operable with one hand, requiring no manual force for maintaining it in any pre-set degree of deformation and one which can be very economically manufactured and consequently discarded once it has been used.

Having thus described my invention, what I claim and desire to secure by Letters Patent is:

1. A flow control valve comprising: a section of flexible tubing; a sheath of flexible material surrounding a portion of the length of said tubing; a strip of malleable material extending along the length of said sheath; and means for securing said strip to said sheath, said strip serving to retain said tubing and sheath in any deformed position into which they may be bent.

2. A flow control valve comprising: a section of flexible tubing; a sheath of flexible material surrounding a portion of the length of said tubing; and a strip of malleable material embedded in said sheath along one side thereof, said strip serving to retain said tubing and sheath in any deformed position into which they may be bent.

3. A flow control valve comprising: a section of flexible tubing; a sheath of flexible material surrounding a portion of the length of said tubing; and a strip of malleable material embedded in said sheath along each of two diametrically opposed sides thereof, said strip serving to retain said tubing and sheath in any deformed position into which they may be bent.

References Cited in the file of this patent

UNITED STATES PATENTS

| | | |
|---|---|---|
| 1,037,406 | Albers | Sept. 3, 1912 |
| 1,060,665 | Bell | May 6, 1913 |
| 2,002,835 | Rose | May 28, 1935 |
| 2,540,364 | Adams | Feb. 6, 1951 |

FOREIGN PATENTS

| | | |
|---|---|---|
| 647,226 | Great Britain | of 1950 |